United States Patent [19]
Frizzell et al.

[11] 3,747,380
[45] July 24, 1973

[54] AUTOMATED HANDLING OF VESSEL HEADS

[76] Inventors: Walter Frizzell, 2816 Sierra Dr.; Quinton D. Gilliland, 2812 Sierra Dr., both of Fort Worth, Tex. 76116

[22] Filed: Aug. 13, 1971

[21] Appl. No.: 171,499

[52] U.S. Cl............................ 72/21, 72/412, 72/421, 72/DIG. 11, 113/113 A
[51] Int. Cl......................... B21b 37/08, B21d 11/04
[58] Field of Search...................... 72/419, 420, 421, 72/24, 21, 422, 412, DIG. 11; 113/113 A, 113 R; 214/1.3; 198/19; 269/46

[56] References Cited
UNITED STATES PATENTS
1,648,060  11/1927  Rowe.............................. 72/DIG. 11
3,051,216  8/1962  Tomka................................ 72/422

*Primary Examiner*—Charles W. Lanham
*Assistant Examiner*—R. M. Rogers
*Attorney*—Wm. T. Wofford et al.

[57] ABSTRACT

Method of and apparatus for semi-automatically forming dished heads for vessels characterized by the steps of suspending a piece of metal from which the head is to be made and repeatedly incrementally dishing a small portion of the piece of metal in a dishing press in a conventional manner, but automatically advancing the piece of metal a predetermined amount for the next incremental dishing stroke; in contrast to the prior art manual handling of the heads. Also disclosed is a preferred embodiment in which the incremental dishing is effected at a predetermined locus that is automatically effected by positioning a terminal end of a structural element so as to constrain the periphery of the piece of metal to a predetermined position as it is automatically advanced; as well as structural and preferred details in which a peripheral region of the piece of metal is pulled coordinately with the dishing strokes of the dishing press.

10 Claims, 3 Drawing Figures

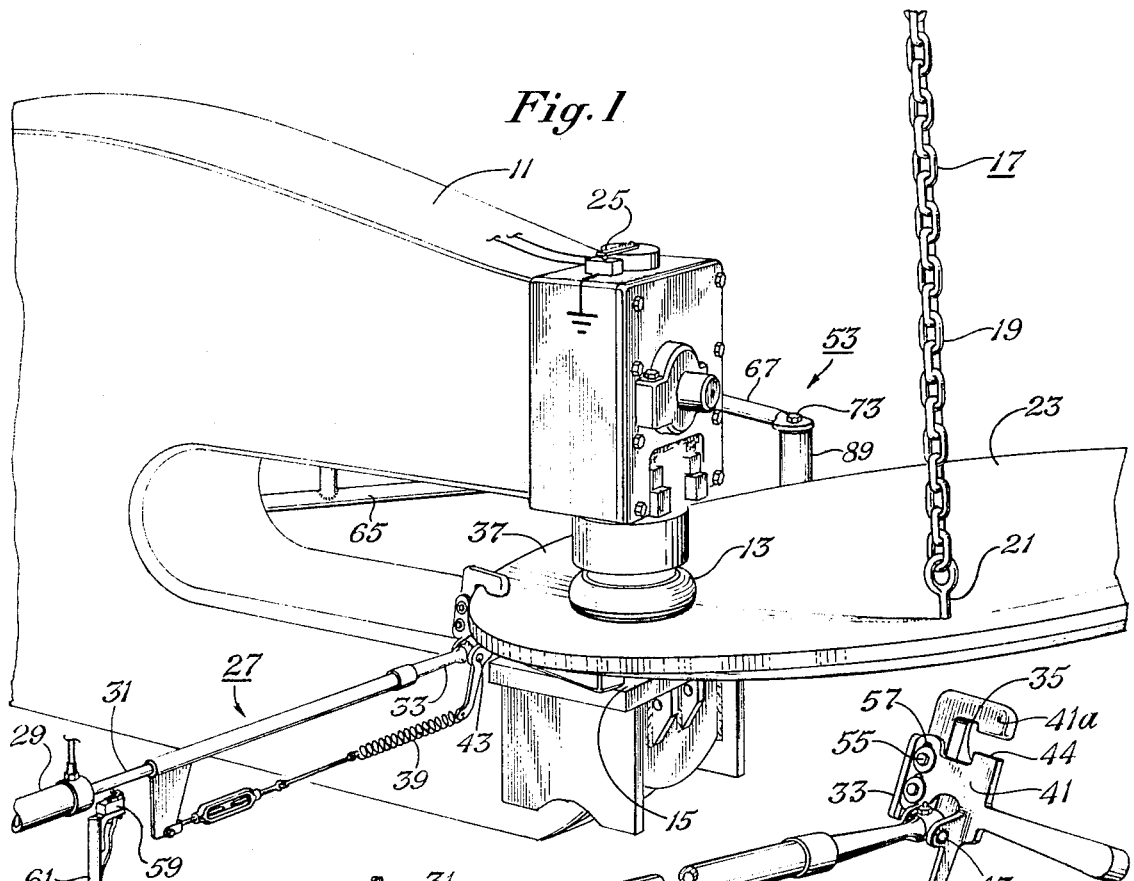
Fig.1
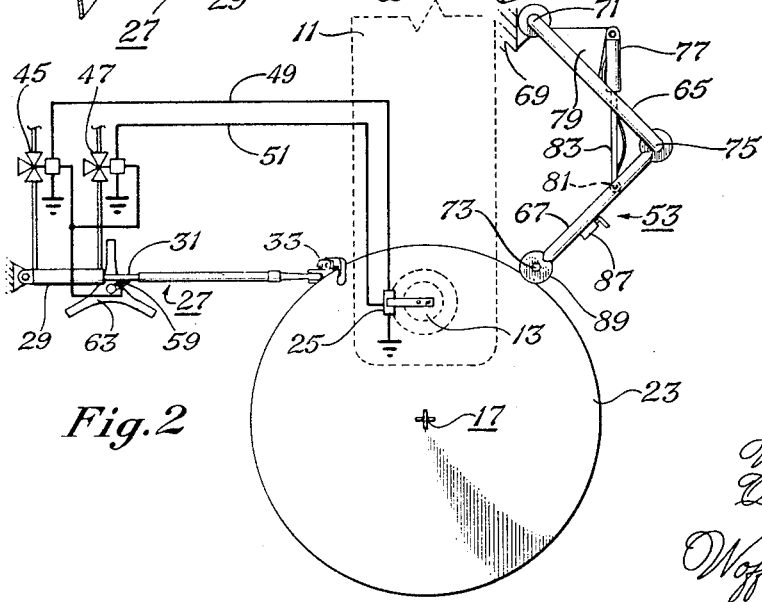
Fig.2
Fig.3
INVENTORS
Walter Frizzell
Quinto D. Gilliland
BY
Wofford, Felsman & Fails
ATTORNEYS

AUTOMATED HANDLING OF VESSEL HEADS

BACKGROUND OF THE INVENTION

1. Field of the Invention

This invention relates to the forming of dished heads for vessels such as pressure vessels. More particularly, the invention relates to method and apparatus for semi-automatically forming dished heads for the vessels.

2. Description of the Prior Art

The prior art has seen the developement of primarily two practical methods of forming dished heads for pressurized vessels. The first method involves extremely large and expensive, fully automated presses that effect the desired head in one operation. Because of the expense of the presses, this first method is limited to vessels of a standard size wherein a large number are to be sold. In the development of the second method, the steps have proceeded from manually forming the vessel, as by welding discrete sectional components together, to manually manipulating a piece of metal to form the dished heads. Thereafter, the head is welded to the body and base. The dished heads were formed by suspending a piece of metal near its midpoint and repeatedly and incrementally dishing the piece of metal to a final shape. This required from two to a half dozen men to manipulate the often large piece of metal, even though it was suspended, to emplace the respective portions under the dishing head and effect the desired shape. Moreover, because the operation was manually performed, the amount the piece of metal was advanced was not always the same, so frequently uneven dishing resulted. Thereafter, the head had to be corrected, reformed, or discarded.

The prior art had no method of semi-automatically manipulating the piece of metal so as to obtain a uniform cold working of the piece of metal to form the desired dishing, or final shape, for the dished head; exluding the elaborate expensive single head presses delineated hereinbefore.

Accordingly, it is an object of this invention to provide a semi-automatic method of forming the dished head that obviates the disadvantages of the prior art, as described hereinbefore.

It is also an object of this invention to provide apparatus facilitating semi-automatically forming the dished heads by providing automated handling of a piece of metal for uniform and reproducible results every time.

These and further objects will become apparent from the attached drawings taken in conjuction with the descriptive matter hereinafter.

BRIEF DESCRIPTION OF THE DRAWINGS

FIG. 1 is a partial isometric view of a piece of metal emplaced within a dishing press and being advanced by the gripping portion of the automatic advancing means.

FIG. 2 is a partial plan view of the embodiment of FIG. 1 with conventional components illustrated schematically.

FIG. 3 is a partial isometric view of the automated advancing mechanism, employing the gripping means.

BRIEF DESCRIPTION OF PREFERRED EMBODIMENTS

Referring to FIGS. 1 and 2, the apparatus for forming dished heads for a vessel comprises the major elements or sub-assemblies of dishing press 11; suspension means 17 for suspending a piece of metal near its midpoint so that a radial sector of the piece of metal is emplaced within the dishing press; limit switch means 25 for effecting coordinated action of an advancing means in conjunction with the dishing strokes of the dishing press; and an advancing means 27 for advancing for the piece of metal after each dishing stroke. A positioning means 53 is disposed adjacent the dishing press 11 for facilitating correctly positioned advance of the piece of metal by the advancing means 27.

The dishing press 11 has a ram head 13 and a crimping dish means such as dish 15 for inducing an incremental crimp into a piece of metal 23 interposed therebetween. The ram head 13 may be powered by hydraulic means or by an eccentric cam on a large shaft turned by a large flywheel. In any event, the ram head 13 must be capable of imposing a large force near the terminal portion of its stroke. The crimping dish means such as dish 15 had a degree of dish, or indentation, that is matched with the curvature of the ram head 13. The degree of curvature is provided in accordancd with the prior art for effecting the incremental dishing of the head in order to provide the final shape of the dished heads. Since the degree of curvature is not being claimed per se, there is no need for a detailed description of the art of determining the degree of curvature herein. It is sufficient to note that the objective is to repeatedly provide small incremental dishing on small portions of the piece of metal. Either the ram head 13 or the dish 15 is adjustable vertically to accommodate different thicknesses of the piece of metal 23. The repeated incremental dishing cold works the metal with the beneficial increases in strength and other physical properties desirable for pressure vessels. It is known in the prior art to employ the method of incrementally dishing a small portion of the piece of metal and thereafter advancing the piece of metal 23 to emplace an adjacent portion intermediate the ram head 13 and the dish 15, so the detailed description of the considerations involved need not be incorporated hereinto, since one skilled in the art would be familiar with this process.

The suspenson means 17; such as, chain 19 and eye bolt 21 having a nut (not shown) beneath the piece of metal 23 is employed for suspending the piece of metal 23 near its midpoint. The piece of metal 23 is preferably circular for forming circular dished heads, although other shapes may be employed for forming other shape dished heads. A radial sector of the piece of metal 23 is emplaced within the dishing press 11 so as to emplace a portion of the piece of metal between the ram head 13 and the dish 15 for the incremental dishing.

The limit switch means 25 is disposed so as to be operated responsive to respective dishing strokes of the ram head 13. Preferably, the limit switch means 25 is disposed contiguous a portion of the ram head 13, or its associated mechanism, so as to be closed at a predetermined position of the ram head 13. The correlative closing of the limit switch by the ram head 13 effects the correlated action between the dishing press 11 and the advancing means 27, as described hereinafter. The advancing means 27 is mechanically connectable with the piece of metal 23 which is to be formed into the head and is responsively connected with the limit switch means 25 so as to advance the piece of metal 23 after each dishing stroke. The advancement of the piece of metal 23, as indicated, emplaces a new portion of the piece of metal in the dishing press intermediate the ram head 13 and the dish 15 for a next dishing stroke. Preferably, the advancing means 27 comprises a pulling means for pulling the piece of metal so as to emplace the next adjacent portion within the dishing press. Such a pulling means is illustrated also in FIG. 3, and comprises a fluid powered ram 29; a lineal member such as rod 31 that includes a piston shaft; and a gripping means 33 for gripping and pulling the piece of metal 23 each time the gripping means 33 is pulled and releasing the piece of metal 23 each time the gripping means is pushed. The gripping means comprises a C-shaped aperture 35 for slipping over a phipheral region 37 of the piece of metal 23, FIG. 1. The member 41 of the gripping means 33 defines the C-shaped aperture 35. The member 41 is pivotally mounted via shaft 43 at one end of the rod 31. A spring 39 biases the member 41 so as to tend to place it in a horizontal position whereby the gripping means 33 releases the peripheral region 37 when pushed and grips the peripheral region 37 when pulled. The edges of the ends such as end 44 are bevelled for effecting the requisite gripping action when pulled. The member 41 has a second portion 41a that is slidably mounted via bolts 55 and slot 57 to enable encompassing a variety of thicknesses of metal in the piece of metal 23, yet facilitate the requisite gripping and releasing by the ends of the member 41 defining the C-shaped aperture 35. The rod 31 is reciprocally movable by the ram means 29. The ram means 29 is powered by a fluid under pressure. The fluid is admitted to one end of the ram means 29 responsive to operation of the limit switch means 25. Specifically, three-way solenoid-operated valves 45 and 47 are connected via conductors 49 and 51 with limit switch 25. Responsive to closure of limit switch 25 the respective solenoid valve 47 is opened, in conventional fashion, to admit a fluid such as air under super atmospheric pressure to the piston shaft end of the ram 29 to effect the desired pulling action that is correlated with the vertically reciprocating movement of the ram head 13 in the dishing strokes. For example, after the ram head 13 has completed a downward portion of a dishing stroke to form the incremental dish in the piece of metal 23, the limit switch 25 is closed and effects admission, via valve 47, of high pressure air to the piston shaft end of the ram 29, and effects bleed-off, via valve 45, of low pressure air from the cylinder head end of the ram 29. Accordingly, the gripping means is pulled via rod 31, pulling the gripping means 33 and the peripheral region 37 to advance the piece of metal 23 and emplace the next portion in the dishing press 11 intermediate the ram head 13 and the dish 15.

An adjustably positionable limit switch 59 is employed for limiting the movement of the rod 31 inwardly into the ram 29 and effecting a return of the gripping means 33 for the next pulling stroke. Expressed otherwise, the limit switch 59 is adjustably positioned to stop the pulling stroke and push the gripping means 33, effecting its release from the peripheral region 37 and its return to a starting position to await closure of the limit switch means 25 on the next stroke of the ram head 13. The limit switch 59 may be adjustably positioned by means of an independent rod 61 on a stand 63, FIG. 2. On the other hand, any of the conventional means for adjustably positioning the limit switch 59; such as, an extensible member that is connected with the ram 29 or its support; may be employed. After a predetermined amount of advance of the piece of metal 23 has been effected to emplace the next portion intermediate the ram head 13 and the dish 15, the limit switch 59 is closed, effecting the converse action of the ram 29. In the converse action, high pressure air is admitted via three-way valve 45 to the cylinder end of the ram 29 and air is vented via valve 47 from the piston shaft end of the ram 29.

If desired, the limit switch means 25 may comprise a second contact disposed to close at a second predetermined position of the ram head 13 and effect, by its closure, the desired return of the gripping means 33 for the next advancing stroke.

The positioning means 53 is semi-automatic in operation and is disposed adjacent the dishing press for defining the respective loci of the portions that are to be emplaced in the dishing press with respect to the periphery of the piece of metal 23. For example, where the piece of metal 23 is circular, the loci of the center points of the portions will approximate circles having respective radii with respect to the point of suspension of the piece of metal 23; for example, its center. The positioning means comprises a self-supporting structure that includes first member 65 and scond member 67. The first member 65 is pivotally connected with a support 69 via a pivotal shaft 71. The support 69 may be an integral part of the base of the dishing press 11. The respective members 65 and 67 may comprise welded ladder-like structure for light weight yet considerable strength and sufficient width to support a terminal end 73 of the second member 67. The first and second members 65 and 67 are pivotally connected together via a second pivotal shaft 75. The first and second members are arranged in a V configuration. A second ram means 77 is provided for effecting a desired shape of the V arrangement of the first and second members. Specifically, the second ram means 77 is connected via suitable support member 79 with the first member 65 and is connected with the second member 67 via suitable pin shaft 81 through rod 83 at a point spaced a relatively short distance from the second pivotal shaft 75. In this way, relatively small extensions of the rod 83 are employed to effect relatively large movement of the terminal end 73 of the second member, so as to keep the ram means 77 relatively short. Otherwise, large, expensive ram means will be necessary for the flexibility of dishing 10 and 12 foot heads for pressure vessels, and also dishing small 2 and 3 foot heads. The ram means 77 is powered by a conventional fluid under pressure. The fluid under pressure is admitted via three-way valves (not shown) but similar to three-way valves 45 and 47. The three-way valves are operated responsive to a switch means 87 that is operated by the operator. If desired, a four-way valve may be employed as the switch means 87 for directing the high pressure fluid into and from the respective ends of the ram means 77 simultaneously. For example, the four-way valve means may direct high pressure fluid from a suitable hydraulic pump into the high pressure end of the ram means 77 and simultaneously direct low pressure fluid from the low pressure end of the ram means 77 back to the reservoir. The respective means for powering the ram means are not being claimed, per se, are conventional, and need not be described in greater detail herein. In any event, the ram means 77 is locked in a predetermined position; for example, by a liquid lock effected by a neutral position of the four-way valve 87 or by mechanical means. If desired, the switch means 87 may be employed to control the suitable solenoid valves to maintain a predetermined position of the terminal end 73 for effecting the desired loci of the portions. Preferably, the terminal end 73 has a roller 89 for facilitating advance of the piece of metal with minimum friction.

In operation, the piece of metal 23, preferably circular, is suspended by the eye bolt 21 from the chain 19. The operator operates the switch means 87 to effect the desired position of the roller 89 for emplacement of the first round, or loci, of portions intermediate the ram head 13 and the dish 15 of the dish press 11. The pulling means has its gripping means 33 emplaced on the peripheral portion 37 and the limit switch 59 suitably positioned to stop the pulling stroke and effect return of the gripping means for the next pulling stroke. The limit switch 25 is connected with respective three-way valves 45 and 47 for effecting the pulling stroke after the termination of the dishing stroke by ram head 13. For example, the limit switch 25 may be closed at the bottom of the downward stroke of the ram head 13. Thus, as the ram head 13 is returning to its top position, the operation of the three-way valves 45 and 47 effect a pulling stroke by the gripping means 33, pulling the peripheral edge 37 past roller 89 of the positioning means a predetermined amount so as to advance the next portion of the piece of metal 23 intermediate the ram head 13 and the dish 15. Upon closure of the limit switch 59, as detailed hereinbefore, the pulling stroke is terminated and the opposite action of the ram 29 is effected. Accordingly, the gripping means 33 is pushed to its initial starting position for effecting the next pulling stroke. Concomitantly, the ram head 13 will reach its top position and begin its downward, or powerful dishing stroke, to repeat the cycle.

The incremental dishing is repeated again and again at a given radius, effected by a predetermined position of the roller 89. Once a complete circle has been made, the operator will change the position of the roller 89 and the incremental dishing carried out at a new radius with respect to the point of suspension. The repetitive incremental dishing at the different radii are carried out until the desired shape of the head is effected. Thereafter, the dished piece of metal 23 is removed and finished in accordance with standard operations. For example, it may be flanged in a suitable flanging press and the aperture at the point of suspension closed by suitable means such as welded metal.

In the foregoing description, the switch means 87 has been described as a four-way hydraulic valve controlling hydraulic operation of ram 77, or an electric switch operating a pair of three-way valves controlling pneumatic operation of ram 77. Any other equivalent control valve and system may be employed. For example, an electric switch may be employed to control a pneumatic motor that sensitively controls hydraulic operation of ram 77.

From the foregoing descriptive matter and the drawings, it can be seen that the invention accomplishes the objects delineated hereinbefore and obviates the disadvantages of the prior art. Specifically, the method and apparatus of this invention enables relatively inexpensive, semi-automated formation of dished heads for vessels without requiring the laborious, time-consuming hand methods of forming the vessels, or the exensive gigantic presses that are employed to form a specific size of dished head. Moreover, the invention has all of the advantages of the cold working operation known to those skilled in this art.

Although the invention has been described with a certain degree of particularity, it is understood that the present disclosure has been made only by way of example and that numerous changes in the details of construction and the combination and arrangement of parts may be resorted to without departing from the spirit and the scope of the invention.

What is claimed is:

1. Apparatus for forming dished heads for a vessel comprising:
   a. a dishing press having a ram head and a crimping dish means for inducing an incremental crimp into a small portion of a piece of metal to be made into said dished head;
   b. suspension means for suspending a piece of metal near its midpoint so that a radial sector of said piece of metal is emplaced within said dishing press with a portion intermediate said ram head and said crimping dish means;
   c. limit switch means disposed so as to be operated responsive to respective dishing strokes of said ram head; and
   d. advancing means grippingly and automatically connectable and disconnectable with the piece of metal to be formed into said head and responsively connected with said limit switch means so as to advance said piece of metal after each dishing stroke so as to emplace an adjacent portion of said piece of metal in said dishing press intermediate said ram head and said crimping dish means;
   whereby said piece of metal can be automatically advanced after each dishing stroke to facilitate repeated incremental dishing operations to effect the desired shape of dished head.

2. The apparatus of claim 1 wherein a semiautomatic positioning means is disposed adjacent said dishing press for defining the respective loci of said portions with respect to the periphery of said piece of metal.

3. The apparatus of claim 2 wherein said piece of metal is substantially circular in shape and the loci approach circular configurations withh respect to the point of suspension.

4. The apparatus of claim 3 wherein said positioning means is cnnected with said dishing press and comprises:
   a. a self-supporting structure having first and second members that are arranged in a V configuration, and that are pivotally connected together via a pivotal shaft;
   b. a ram means for effecting a desired shape of the V configuration, said ram means being connected with said first member and with said second member, at least one of the points of connection with the members being spaced a relatively short distance from said pivotal shaft to enable effecting relatively large movement of the terminal end of said second member with a relatively short ram means;
   c. means for powering said ram means to effect a predetermined position of said terminal end of said second member; and
   d. means for maintaining said predetermined position of said terminal end.

5. The apparatus of claim 4 wherein there is provided a terminal roller carried by said terminal end of said second member for facilitating advance of said piece of metal with minimum friction.

6. The apparatus of claim 4 wherein said first member is pivotal in a horizontal plane with respect to said dishing press.

7. The apparatus of claim 1 wherein said advancing means comprises a pulling means for pulling said piece of metal to emplace the next adjacent portion within said dishing press.

8. The apparatus of claim 7 wherein said pulling means engages via a biased gripping means a peripheral region of said piece of metal for gripping and pulling said piece of metal each time the gripping means is pulled and releasing said peripheral region each time the gripping means is pushed.

9. The apparatus of claim 8 wherein said gripping means comprises a member extending around and defining a C-shaped aperture for slipping over said peripheral region, said member defining said C-shaped aperture being pivotally mounted at the end of a reciprocally movable arm and having a second extension arm that is biased to attempt to emplace said member defining said C-shaped aperture in a horizontal plane; said member defining said C-shaped aperture normally engaging said peripheral region at an angle with respect to the vertical and horizontal planes so as to grip on a pulling stroke and release on a pushing stroke.

10. The apparatus of claim 9 wherein the reciprocally movable arm upon which said member defining said C-shaped aperture is mounted is moved reciprocally by a ram means that is powered by a fluid under pressure; said fluid being admitted to respective ends of said ram responsive to limit switch means, at least one of which is said limit switch means that is, in turn, closed by a predetermined position of said ram head in making the respective dishing strokes.

* * * * *